US012048959B2

(12) United States Patent
Watanabe et al.

(10) Patent No.: US 12,048,959 B2
(45) Date of Patent: Jul. 30, 2024

(54) ROD MEMBER FEEDING DEVICE, MACHINE TOOL INCLUDING THE ROD MEMBER FEEDING DEVICE AND CONTROL METHOD FOR THE ROD MEMBER FEEDING DEVICE

(71) Applicants: CITIZEN WATCH CO., LTD., Tokyo (JP); CITIZEN MACHINERY CO., LTD., Nagano (JP)

(72) Inventors: Kiyohiko Watanabe, Nagano (JP); Takanori Shinohara, Nagano (JP); Kenji Shimizu, Nagano (JP)

(73) Assignees: CITIZEN WATCH CO., LTD., Tokyo (JP); CITIZEN MACHINERY CO., LTD., Nagano (JP)

( * ) Notice: Subject to any disclaimer, the term of this patent is extended or adjusted under 35 U.S.C. 154(b) by 771 days.

(21) Appl. No.: 17/192,406

(22) Filed: Mar. 4, 2021

(65) Prior Publication Data
US 2021/0299732 A1    Sep. 30, 2021

(30) Foreign Application Priority Data

Mar. 27, 2020   (JP) .................................. 2020-058898

(51) Int. Cl.
*B21C 51/00*    (2006.01)
*B21D 43/00*    (2006.01)
(52) U.S. Cl.
CPC ............ *B21D 43/006* (2013.01); *B21C 51/00* (2013.01)

(58) Field of Classification Search
CPC ...... B21D 43/006; B21C 51/00; G05B 19/18; B21F 23/005
See application file for complete search history.

(56) References Cited

U.S. PATENT DOCUMENTS 6,665,579 B2 * 12/2003 Sasaki ................... B23B 13/02
82/127
6,785,584 B2 *  8/2004 Yoshikawa .......... G05B 19/182
700/192

(Continued)

FOREIGN PATENT DOCUMENTS

JP            9-19803 A     1/1997
JP       2001-198704 A     7/2001

(Continued)

*Primary Examiner* — Patrick H Mackey
(74) *Attorney, Agent, or Firm* — Birch, Stewart, Kolasch & Birch, LLP

(57) ABSTRACT

To provide a rod member feeding device that reduces the load on a spindle chuck and a finger chuck when a rod member is positioned, as well as providing a machine tool provided with the rod member feeding device, and a control method for the rod member feeding device. A rod member feeding device includes: a feed rod for supplying a rod member to a spindle; a servomotor for moving the feed rod along the axial direction of the spindle; and a control device (exemplified with a motor control device and a control device) for controlling the driving of the servomotor. The control device calculates a deviation between a command position based on an advance amount of the feed rod and the actual position of the feed rod that has been actually advanced by the driving of the servomotor, and controls the driving of the servomotor based on the magnitude of the deviation.

8 Claims, 4 Drawing Sheets

(56) References Cited

U.S. PATENT DOCUMENTS

| | | | | |
|---|---|---|---|---|
| 6,834,539 B2 * | 12/2004 | Faigle | ............... | B23Q 17/003 |
| | | | | 73/114.77 |
| 8,453,544 B2 * | 6/2013 | Cucchi | ............... | B23B 25/06 |
| | | | | 82/126 |
| 8,573,100 B2 * | 11/2013 | Schmidt | ............... | B23B 7/06 |
| | | | | 82/126 |
| 9,731,353 B2 * | 8/2017 | Watanabe | ............ | B23B 13/021 |

FOREIGN PATENT DOCUMENTS

| | | | |
|---|---|---|---|
| JP | 2002-218676 A | | 8/2002 |
| JP | 3703174 B2 | * | 10/2005 |
| JP | 4018796 B2 | | 12/2007 |

\* cited by examiner

ROD MEMBER FEEDING DEVICE, MACHINE TOOL INCLUDING THE ROD MEMBER FEEDING DEVICE AND CONTROL METHOD FOR THE ROD MEMBER FEEDING DEVICE

TECHNICAL FIELD

The present invention relates to a rod member feeding device including a feed rod that sends out a rod member fixed by a finger chuck to the spindle side, a servomotor that moves the feed rod along the axial direction of a spindle, and a control device that controls the drive of the servomotor, as well as relating to a machine tool including the rod member feeding device, and a control method of the rod member feeding device.

BACKGROUND ART

For example, Patent Document 1 discloses a structure of an automatic lathe apparatus including an automatic lathe body and a rod member feeding device. A feed rod of the rod member feeding device is arranged on the extension line of the spindle of the automatic lathe body. When a plurality of products are cut out from a rod member (for example, a lengthy rod member) in this automatic lathe apparatus, the rod member is supplied toward the spindle by using the feed rod.

The rear end of the rod member is gripped by a finger chuck of the feed rod, and the rod member advances until the front end of the rod member contacts a stopper tool. When the front end of the rod member comes into contact with the stopper tool, the spindle chuck is closed to hold the rod member on the spindle. Then, after the stopper tool is retracted from the front end of the rod member, the rod member is processed with a tool.

PRIOR ART DOCUMENTS

Patent Documents

[Patent Document 1] U.S. Pat. No. 4,018,796

SUMMARY OF THE INVENTION

Problems to be Solved by the Invention

When the front end of the rod member has been advanced with high torque until it comes into contact with the stopper tool, the spindle chuck is closed and the stopper tool is quickly retracted from the front end of the rod member, a large load is left on the devices located from the rod member to the servomotor that drives the feed rod, resultantly, a large load is also generated on the spindle chuck and the finger chuck. Therefore, there has been a demand for reducing the loads when the rod is positioned.

The present invention has been devised in view of the above circumstances, and it is therefore an object of the present invention to provide a rod member feeding device that reduces the load on the spindle chuck and the finger chuck when a rod member is positioned, as well as providing a machine tool equipped with the rod member feeding device, and a control method for the rod member feeding device.

Means for Solving the Problems

According to a first aspect of the invention, a rod member feeding device comprising:

a feed rod for supplying a rod member to a spindle;
a servomotor for moving the feed rod along the axial direction of the spindle; and
a control device for controlling the driving of the servomotor, characterized in that the control device calculates a deviation between a command position based on the advance amount of the feed rod and the actual position of the feed rod that has been actually advanced by the driving of the servomotor, and controls the driving of the servomotor based on the magnitude of the deviation.

According to a second aspect of the invention, the servomotor is driven so as to retract the feed rod by the maximum value of the deviation which is calculated by sequentially comparing the command position obtained by successively adding the advance amount of the feed rod with the actual position of the feed rod that has been advanced.

According to a third aspect of the invention, the control device stops the driving of the servomotor when the torque value of the servomotor reaches a predetermined torque limit value.

According to a fourth aspect of the invention, a machine tool is characterized by inclusion of any one of the above rod member feeding devices.

According to a fifth aspect of the invention, a control method for a rod member feeding device including: a feed rod for supplying a rod member to a spindle; a servomotor for moving the feed rod along the axial direction of the spindle; and a control device for controlling the driving of the servomotor, comprising the steps of:

designating a command position based on the advance amount of the feed rod;
driving the servomotor to rotate in a predetermined direction so as to advance the feed rod by the advance amount;
reading the actual position at which the feed rod has been actually advanced by the servomotor;
calculating a deviation between the designated command value and the read actual position; and
controlling the driving of the servomotor according to the magnitude of the deviation.

Effects of the Invention

The present invention can obtain the following effects.
As the feed rod that pushes the rod member held by the finger chuck is retracted at the updated maximum amount of deviation, it is possible to reduce the load on the spindle chuck and the finger chuck when the rod member is positioned.

BEST MODE FOR CARRYING OUT THE INVENTION

Figure 1:
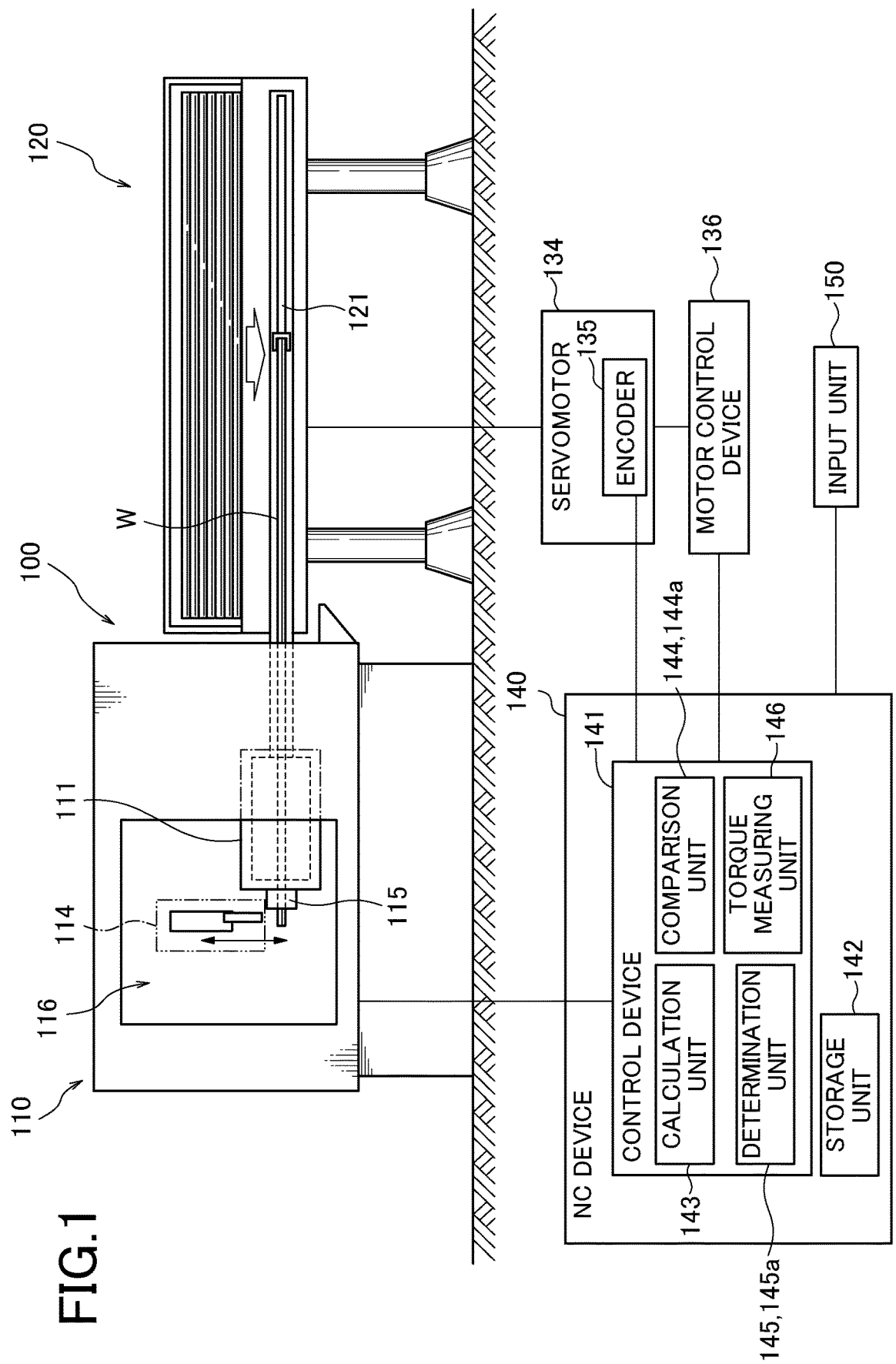
FIG. 1 is a diagram illustrating an automatic lathe apparatus as an example of a machine tool provided with a rod member feeding device according to the present invention.

Hereinafter, a rod member feeding device of the present invention as well as a machine tool provided with the rod member feeding device and a control method for the rod member feeding device will be described with reference to the drawings. As shown in FIG. 1, an automatic lathe apparatus 100 includes an automatic lathe body 110, a rod member feeding device 120, and an NC device 140, and is one example of a machine tool that machines a rod member W with a predetermined cutting tool.

The rod member feeding device 120 is called a bar feeder, and is configured to be able to supply the rod member W to the automatic lathe body 110.

The rod member feeding device 120 includes a feed rod 121 that moves between the rod member feeding device 120 and the automatic lathe body 110, a servomotor 134 that drives the feed rod 121, and a motor control device 136 that controls the servomotor 134. The feed rod 121 is arranged on the extension line of a spindle 111 of the automatic lathe body 110. A plurality of rods (for example, lengthy rod members) W are stored in the rod member feeding device 120, and when the servomotor 134 moves the feed rod 121, the rod members W are supplied from the rod member feeding device 120 toward the spindle 111 of the automatic lathe body 110, one by one.

Figure 2:
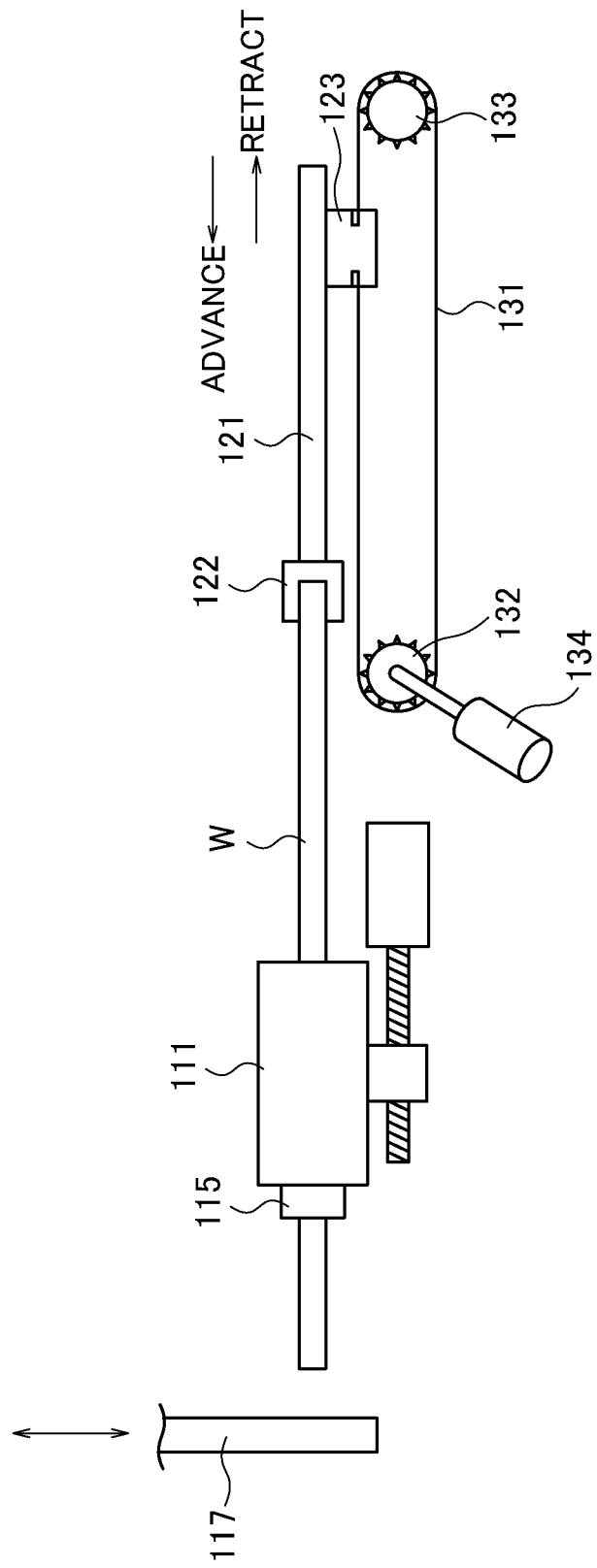
FIG. 2 is a schematic diagram showing details of the automatic lathe apparatus shown in FIG. 1.

As shown in FIG. 2, the servomotor 134 is connected to a drive sprocket 132. Wound between the drive sprocket 132 and a driven sprocket 133 is a chain 131. The feed rod 121 is coupled with the chain 131 via a coupling 123. A finger chuck 122 is disposed at the front end of the feed rod 121, and the finger chuck 122 grips the rear end of the rod member W.

The motor control device 136 controls the drive of the servomotor 134 based on a signal from a control device 141 of the NC device 140. When the servomotor 134 rotates so as to rotate the drive sprocket 132 counterclockwise as in FIG. 2, the chain 131 also rotates counterclockwise. As a result, the feed rod 121 moves forward along the axial direction of the spindle 111. The amount of rotation of the servomotor 134 is detected by the encoder 135. The detection result of the encoder 135 is supplied to the control device 141 of the NC device 140.

The motor control device 136 includes a CPU, a memory and others, and loads each of various programs and data stored in, for example, ROM into RAM, and runs the program. Thereby, the operation of the servomotor 134 can be controlled based on the program.

Specifically, the motor control device 136 drives the servomotor 134 so as to rotate in a predetermined direction in a torque skip mode, for example. The torque skip mode is a mode in which the driving of the servomotor 134 is stopped when the torque value of the servomotor 134 has reached a predetermined value (torque limit value).

The motor control device 136 causes the servomotor 134 to rotate in a predetermined direction so that the feed rod 121 advances by a designated advance amount. The advance amount and the torque limit value are designated through an input unit 150 or b the program, and stored in a storage unit 142 of the NC device 140.

Additionally, the motor control device 136 can also cause the servomotor 134 to rotate in the direction opposite to the predetermined direction. In this case the feed rod 121 moves backward. When the motor control device 136 stops the driving of the servomotor 134, the forward/backward movement of the feed rod 121 stops.

The automatic lathe body 110 has a machining chamber 116 in which the rod member W supplied from the rod member feeding device 120 is machined.

A tool 114 such as a cutting tool for machining the rod member W is installed in the machining chamber 116 so as to machine the rod member W held by the spindle 111. The spindle 111 is rotatably supported on the spindle base. The axis of the spindle 111 coincides with the axis of the rod member W. The spindle 111 is provided with a spindle chuck 115. When the spindle chuck 115 is closed, the rod member W is held, whereas when the spindle chuck 115 is opened, the rod member W is released. The tool 114 is arranged on the tool post and can be moved in the radial direction of the rod member W and can be moved along the direction of the rotation axis of the spindle 111.

Further, as shown in FIG. 2, a stopper tool 117 is provided in front of the spindle chuck 115. The stopper tool 117 is formed in a flat plate shape, for example, so as to be in contact with the front end of the rod member W. When the front end of the rod member W comes into contact with the stopper tool 117, the front end of the rod member W is positioned. When the front end of the rod member W has been positioned, the stopper tool 117 retracts from the front end of the rod member W, based on a command from the control device 141.

The rotation of the spindle 111, the motion of the tool post and others are controlled by the control device 141 of the NC device 140. Further, the driving of the rod member feeding device 120 is actuated/released based on a command from the control device 141.

The control device 141 includes a CPU, a memory and others, and loads each of various programs and data stored in, for example, ROM into RAM, and runs the program. Thereby, the operation of the automatic lathe body 110 and the rod member feeding device 120 can be controlled based on the program.

The control device 141 includes a calculation unit 143, a comparison unit 144, 144a, a determination unit 145, 145a, and a torque measuring unit 146.

The calculation unit 143 calculates the deviation between the command position calculated from the advance amount of the feed rod designated through the input unit 150 or by the program and the actual position of the feed rod 121 that has actually advanced by the driving of the servomotor 134. The comparison unit 144 compares the deviation already stored in the storage unit 142 with the deviation calculated at present, and the determination unit 145 determines the magnitude of the deviation.

Further, in order to determine whether the rod member has been abutted against the stopper tool by means of the feed rod and its drive servomotor, the comparison unit 144a compares the torque value of the servomotor 134 measured by the torque measurement unit 146 and the designated torque limit, and the determination unit 145a determines whether or not the measured torque value has reached the torque limit value.

Figure 3:
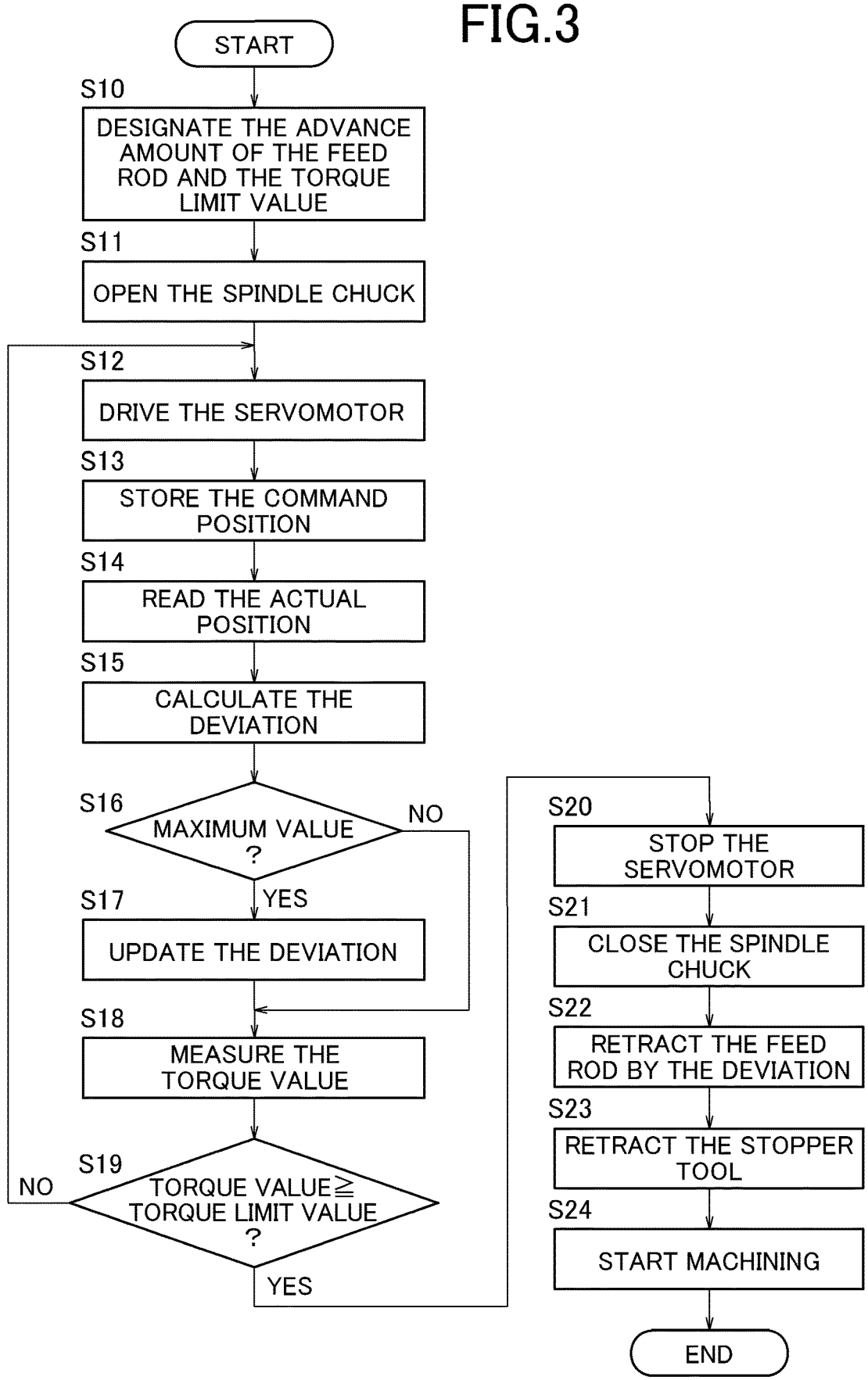
FIG. 3 is an operation flowchart of rod member feeding.
Figure 4:
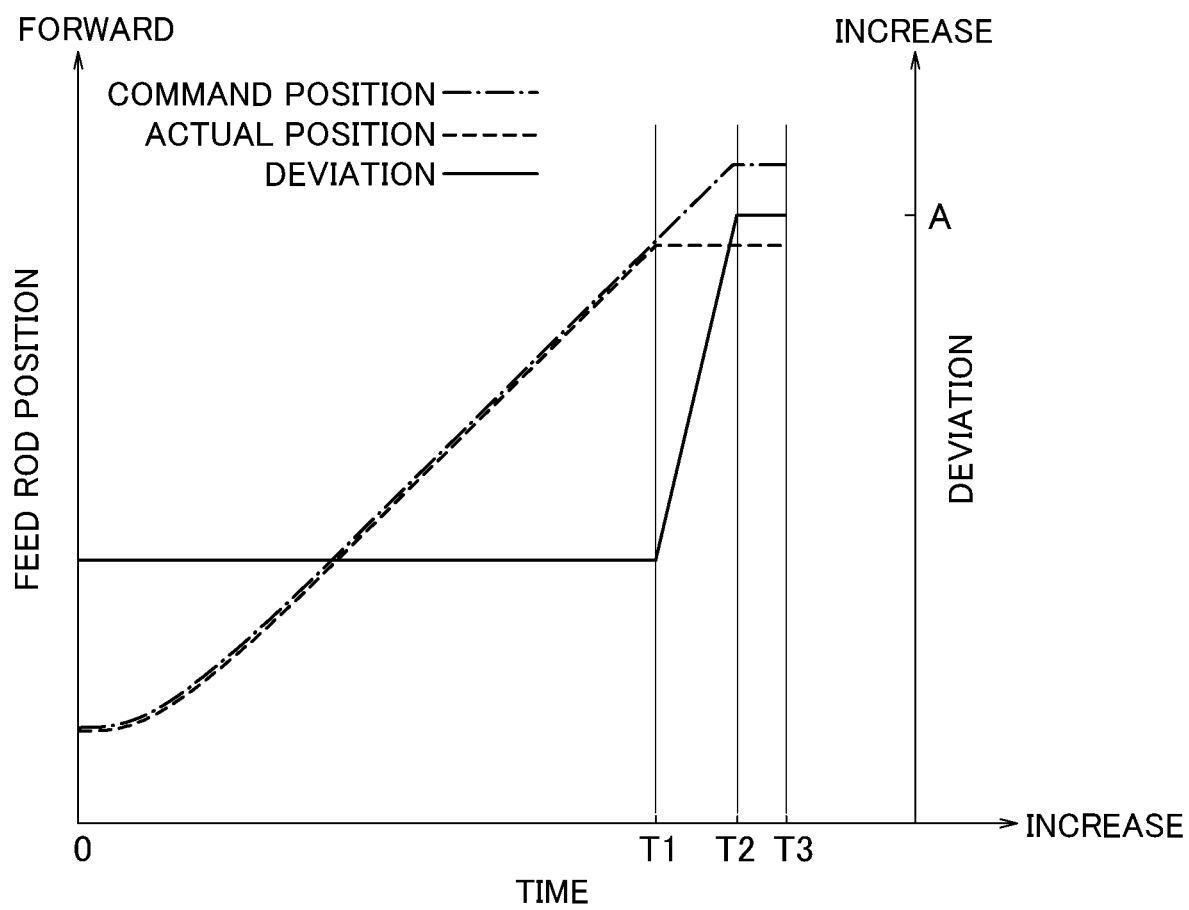
FIG. 4 is a diagram for explaining the relationship between the position of a feed rod, the movement time of the feed rod, and the deviation.

FIG. 3 is an operation flowchart of rod member supply, and FIG. 4 is a diagram for explaining the relationship between the command position, the actual position and deviation of the feed rod 121, and the movement time of the feed rod 121.

First, the operator designates the advance amount of the feed rod 121 in a single operation and the torque limit value for stopping the servomotor 134 (step S10 in FIG. 3). Next, the control device 141 opens the spindle chuck 115 (step S11), and sets the stopper tool 117 in front of the spindle chuck 115.

Subsequently, the motor control device 136 causes the servomotor 134 to rotate in a predetermined direction so that the feed rod 121 advances by the designated advance amount (step S12). The designated advance amount is sequentially added and the sum is stored in the storage unit 142 as the command position (indicated by the chain line in FIG. 4) (step S13). Next, the control device 141 reads the actual position (indicated by the broken line in FIG. 4) at which the feed rod 121 has actually advanced, from the amount of rotation of the servomotor 134 detected by the encoder 135 (step S14).

Then, the calculation unit 143 calculates the deviation (indicated by the solid line in FIG. 4) between the command position calculated from the designated advance amount and the read actual position (step S15 in FIG. 3).

The comparison unit 144 compares the deviation calculated at present with the deviation already calculated and stored in the storage unit 142, and the determination unit 145 determines the magnitude of the deviation (step S16).

At step S16, when the determination unit 145 determines that the deviation calculated at present is greater than the deviation stored in the storage unit 142 (that is, the deviation calculated at present is the maximum value) (YES at step S16), then, the deviation stored in the storage unit 142 is updated with the deviation calculated at present and the update is stored (step S17).

When the determination unit 145 determines at step S16 that the deviation calculated at present is smaller than the deviation stored in the storage unit 142 (NO at step S16), the deviation stored in the storage unit 142 is not updated.

At step S18, the torque measuring unit 146 measures, for example, the torque value of the servomotor 134 at the time when the actual position is read.

Next, the comparison unit 144a compares the measured torque value with the designated torque limit value, and the determination unit 145a determines whether or not the measured torque value has reached the torque limit value (step S19).

When it is determined at step S19 that the torque value measured by the determination unit 145a has not reached the torque limit value (NO at step S19), the process returns to step S12, and the motor control device 136 causes the servomotor 134 to rotate so as to advance the feed rod 121 by the designated advance amount. In the torque skip mode, the operations from steps S12 to S19 are repeated.

When, as a result of advancing the feed rod 121, wen the front end of the rod member W comes into contact with the stopper tool 117 (indicated at time T1 in FIG. 4), the feed rod 121 cannot move forward any more after time T1, and the actual position will not increase and is fixed at a constant value as shown by the broken line in FIG. 4. That is, the rod member W is positioned.

On the other hand, as to the command position, if the torque value measured by the determination unit 145a at step S19 does not reach the torque limit value even after time T1 when the front end of the rod member W contacts the stopper tool 117, the torque skip mode will not be canceled (the operations from step S12 to step S19 are repeated), and the designated advance amount is continuously added (as shown by the chain line in FIG. 4, the command position continuously rises after time T1).

Therefore, after time T1, the deviation between the command position and the actual position gradually increases, and rises steeply as shown by the solid line in FIG. 4.

As a result of the operation in the torque skip mode, when the determination unit 145a determines that the measured torque value has reached the torque limit value (YES at step S19 in FIG. 3, shown at time T2 in FIG. 4), the motor control device 136 stops the rotation of the servomotor 134 after a predetermined time has elapsed from this point of time T2 (indicated at time T3 in FIG. 4).

From time T2 to time T3, the designated advance amount is not added, so that the command position does not rise as indicated by the chain line in FIG. 4, but takes a constant value. On the other hand, since the actual position is constant after time T1, the actual position remains constant as shown by the broken line in FIG. 4. That is, from time T2 to time T3, the difference between the actual position and the command position is constant, hence the deviation is constant as shown by the solid line in FIG. 4. Therefore, the deviation takes a maximum deviation value A (e.g., 5 mm) at time T2, and this is stored in the storage unit 142.

Subsequently, when the drive of the servomotor 134 is stopped (indicated at time T3 in FIG. 4), the feed rod 121 is also stopped (step S20 in FIG. 3). Then, the control device 141 closes the spindle chuck 115 and holds the vicinity of the front end of the rod member W (step S21).

Next, the control device 141 calls the deviation stored in the storage unit 142, and the motor control device 136 drives the servomotor 134 so as to rotate in the opposite direction and retract the feed rod 121 by the deviation A (e.g., 5 mm) (step S22).

Thereafter, the control device 141 retracts the stopper tool 117 from the front end of the rod member W (step S23), and the control device 141 sets the tool 114 near the front end of the rod member W and starts machining the rod member W (Step S24).

In this way, since the feed rod 121 moves back by the maximum deviation, it is possible to reduce the load on the spindle chuck 115 and the finger chuck 122 when the rod member W is positioned.

Description with reference to FIG. 1 was given by taking an example in which the automatic lathe apparatus 100 includes an NC device 140 while the rod member feeding device 120 includes a motor control device 136, that is, the motor control device 136 is configured separately from the NC device 140. However, the present invention is not limited to this example. For example, the motor control device 136 may be provided in the NC device 140, or the rod member feeding device 120 may have the NC device 140. Therefore, the motor control device 136 and the control device 141 should both correspond to the control device of the present invention.

DESCRIPTION OF REFERENCE NUMERALS

100 . . . automatic lathe apparatus (machine tool)
110 . . . automatic lathe body
111 . . . spindle
114 . . . tool
115 . . . spindle chuck
116 . . . machining chamber
117 . . . stopper tool
120 . . . rod member feeding device
121 . . . feed rod
122 . . . finger chuck
123 . . . coupling
131 . . . chain
132 . . . drive sprocket
133 . . . driven sprocket
134 . . . servomotor
135 . . . encoder
136 . . . motor control device (control device)
140 . . . NC device
141 . . . control device
142 . . . storage unit
143 . . . calculation unit
144 . . . comparison unit 144a ... comparison unit
145 ... determination unit
145a ... determination unit
146 ... torque measuring unit
150 ... input unit
A ... updated difference value (maximum value)
T1 ... time at which the front end of the rod member comes into contact with the stopper tool
T2 ... time at which the torque value reaches the torque limit value
T3 ... time at which a predetermined time has passed since the torque value reached the torque limit value
W ... rod member

The invention claimed is:

1. A rod member feeding device comprising:
a feed rod for supplying a rod member to a spindle;
a servomotor for moving the feed rod along an axial direction of the spindle; and
a control device for controlling driving of the servomotor,
wherein the control device calculates a deviation between a command position based on an advance amount of the feed rod and an actual position of the feed rod that has been actually advanced by the driving of the servomotor, and wherein
the control device controls the driving of the servomotor so as to retract the feed rod based on a magnitude of the deviation in a state where the rod member is held by the spindle chuck wherein the rod member has been advanced until the front end of the rod member contacts a stopper tool that is provided in front of the spindle and positions the rod member.

2. The rod member feeding device according to claim 1, wherein the servomotor is driven so as to retract the feed rod by a maximum value of the deviation calculated by sequentially comparing the command position obtained by successively adding the advance amount of the feed rod with the actual position of the feed rod that has been advanced.

3. The rod member feeding device according to claim 2, wherein the control device stops the driving of the servomotor when a torque value of the servomotor reaches a predetermined torque limit value.

4. A machine tool provided with the rod member feeding device according to claim 2.

5. The rod member feeding device according to claim 1, wherein the control device stops the driving of the servomotor when a torque value of the servomotor reaches a predetermined torque limit value.

6. A machine tool provided with the rod member feeding device according to claim 5.

7. A machine tool provided with the rod member feeding device according to claim 1.

8. A control method for a rod member feeding device including: a feed rod for supplying a rod member to a spindle; a servomotor for moving the feed rod along an axial direction of the spindle; and a control device for controlling driving of the servomotor,
the control method comprising the steps of:
designating a command position based on an advance amount of the feed rod;
driving the servomotor to rotate in a predetermined direction so as to advance the feed rod by the advance amount;
reading an actual position at which the feed rod has been actually advanced by the servomotor;
calculating a deviation between a designated command value and a read actual position; and
controlling the driving of the servomotor so as to retract the feed rod according to a magnitude of the deviation after the rod member is held by the spindle chuck wherein the rod member has been advanced until the front end of the rod member contacts a stopper tool that is provided in front of the spindle and positions the rod member.

* * * * *